(12) United States Patent
Elmasry et al.

(10) Patent No.: US 12,361,304 B2
(45) Date of Patent: Jul. 15, 2025

(54) METHOD AND SYSTEM FOR DEVELOPING BATTLEFIELD AI TAXONOMY

(71) Applicant: Rockwell Collins, Inc., Cedar Rapids, IA (US)

(72) Inventors: George F. Elmasry, San Marcos, CA (US); Paul S. Corwin, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 812 days.

(21) Appl. No.: 17/537,144

(22) Filed: Nov. 29, 2021

(65) Prior Publication Data

US 2023/0169370 A1    Jun. 1, 2023

(51) Int. Cl.
*G06N 5/04* (2023.01)
*H04L 9/40* (2022.01)

(52) U.S. Cl.
CPC ......... *G06N 5/041* (2013.01); *H04L 63/1458* (2013.01)

(58) Field of Classification Search
CPC ............................ G06N 5/041; H04L 63/1458
See application file for complete search history.

(56) References Cited

U.S. PATENT DOCUMENTS

| | | | |
|---|---|---|---|
| 8,214,480 B2 | 7/2012 | Pauly | |
| 8,234,522 B2 | 7/2012 | Baker et al. | |
| 10,869,200 B1 | 12/2020 | Huang et al. | |
| 11,023,774 B2 | 6/2021 | Nefedov | |
| 11,184,950 B1 | 11/2021 | Elmasry et al. | |
| 2018/0232657 A1* | 8/2018 | Acharya | G06Q 10/10 |
| 2020/0153535 A1* | 5/2020 | Jayaweera Kankanamge | G06V 10/82 |
| 2021/0012239 A1 | 1/2021 | Arzani et al. | |
| 2021/0306861 A1 | 9/2021 | Elmasry et al. | |
| 2025/0039744 A1* | 1/2025 | Rachid | H04W 28/18 |

FOREIGN PATENT DOCUMENTS

| | | |
|---|---|---|
| WO | 2021028442 A1 | 2/2021 |
| WO | 2021133791 A1 | 7/2021 |

OTHER PUBLICATIONS

Sharma, Purabi & Sarma, Kandarpa & Mastorakis, Nikos. (2020). Artificial Intelligence Aided Electronic Warfare Systems—Recent Trends and Evolving Applications. IEEE Access. 8. 1-1. 10.1109/ACCESS.2020.3044453.

* cited by examiner

*Primary Examiner* — Duc C Ho
(74) *Attorney, Agent, or Firm* — Suiter Swantz IP

(57) ABSTRACT

A system and method for developing an artificial intelligence (AI) taxonomy is disclosed. The system includes a cognitive engine configured to perform deep learning processes, and includes a controller. The controller includes a processor and a memory communicatively coupled to the processor. The memory stores executable instructions, which when executable by the processors, causes the processor to collect one or more metrics from node packets received from at least one node, generate a keyword based on the one or more metrics, generate a key phrase based on the keyword in combination with another one of the one or more metrics, and generate a sentence from the key phrase, wherein the key phrase is used for communication with at least one of a plurality of network AI entities.

14 Claims, 13 Drawing Sheets

| Metrics | Key Phrase 2-D | Sentence |
|---|---|---|
| RSSI | -- | RSSI/D (my RSSI is A and my decision is X) |
| RSSI | -- | RSSI/H/Dc (my RSSI is A, my hypothesis is X and my collaborative decision is Y) |
| RSSI and SNIR | SNIR = f(RSSI) | RSSI/SNIR/D |
| RSSI and SNIR | SNIR = f(RSSI) | RSSI / SNIR /H/Dc |

| Metrics | Key Phrase 2-D | Sentence |
|---|---|---|
| Jam | -- | Dc = yes, D = Y/N<br>Collective jamming decision = yes; my decision can be Yes/No |
| Jam | -- | Dc = Yes, H = Y/N, D = G/R<br>Collective jamming decision = yes; my hypothesis can be Yes/No and my decision can be Green zone or Red zone |
| Jam and angle | Jamming power = f(angle) | Dc = Yes, J[angle] = P[angle]; D = G/R<br>Collective jamming decision = yes; my jamming power as a function of angle = P[angle] and my decision can be Green zone or Red zone |
| Jam and angle | Jamming power = f(angle) | Dc = Yes; J[angle] = P[angle]; H = G/R; D = lat, long, alt.<br>Collective jamming decision = yes; my jamming power as a function of angle = P[angle]; my hypothesis can be Green zone or Red zone and my decision is jammer's location in latitude, longitude and altitude. |

METHOD AND SYSTEM FOR DEVELOPING BATTLEFIELD AI TAXONOMY

CROSS REFERENCE TO RELATED APPLICATIONS

This patent application is related to U.S. patent application Ser. No. 16/805,227 entitled "INCORPORATING CO-SITE INTERFERENCE IN DYNAMIC SPECTRUM ACCESS SYSTEMS WITH MINIMAL COMPUTATIONAL NEEDS" filed Feb. 28, 2020, U.S. patent application Ser. No. 17/148,381 entitled "SPECTRUM INFORMATION FUSION FOR DYNAMIC SPECTRUM ACCESS OF HIERARCHICAL HETEROGENEOUS WIRELESS NETWORKS" filed Jan. 13, 2021, U.S. patent application Ser. No. 17/024,266 entitled "SYSTEM AND METHOD FOR GENERATING CONTROL AND NON-PAYLOAD COMMUNICATION (CNPC) CONGESTION METRICS AT A GROUND CONTROL STATION" filed Sep. 17, 2020, U.S. patent application Ser. No. 17/024,279 entitled "SYSTEM AND METHOD FOR SAME-CHANNEL OUT-OF-BAND SPECTRUM SENSING FOR COMMAND AND CONTROL (C2) COMMUNICATIONS TO UNMANNED AIRCRAFT SYSTEMS (UAS)" filed Sep. 17, 2020, U.S. patent application Ser. No. 17/024,309 entitled "SYSTEM AND METHOD FOR SPECTRUM SITUATIONAL AWARENESS VIA SERVER-BASED FUSION IN A COMMAND AND CONTROL (C2) LINK SYSTEM FOR UNMANNED AIRCRAFT SYSTEMS (UAS)" filed Sep. 17, 2020, U.S. patent application Ser. No. 16/678,942 entitled "DYNAMIC SPECTRUM ACCESS CONTROL TRAFFIC OVER MILITARY RADIO VOICE CHANNEL" filed Nov. 8, 2019, and U.S. patent application Ser. No. 16/735,877 entitled "HYBRID DYNAMIC SPECTRUM ACCESS OF HIERARCHICAL HETEROGENEOUS NETWORKS WITH NO SINGLE POINT OF FAILURE" filed Jan. 7, 2020, all of which are hereby incorporated by reference in its entirety for all purposes.

BACKGROUND

The use of artificial intelligence (AI) in the battlefield is becoming more and more common. It is expected that in the future, adversaries may each utilize AI-controlled weaponry and defenses that battle each other with little or no human-in-the-loop. Developed as a set of distributed and hierarchical cognitive engines, AI requires that: (1) cognitive engines within a network communicate to each other through a common language (taxonomy) and (2) the cognitive engines assess their performance in order to be able to adapt to the battlefield needs without human intervention. Current AI systems are limited in their ability to develop taxonomies, particularly in sectors that require a diverse environment, such as a battlefield environment. Therefore, it would be advantageous to provide a solution that cures the shortcomings described above.

SUMMARY

A method for installing an artificial intelligence (AI) taxonomy in a system is disclosed. In one or more embodiments, the method includes collecting one or more metrics for received packets from at least one node, wherein the metrics include at least one of packet delay, packet loss ratio, a ratio of decoded packets to received packets, received signal strength indication, or signal to interference ratio. In one or more embodiments, the method further includes generating, based on the one or more metrics, a keyword. In one or more embodiments, the method further includes generating a key phrase from the keyword. In one or more embodiments, the method further includes generating a sentence from the key phrase, wherein the key phrase is used for communication with a receiving AI entity.

In some embodiments, the method further includes creating a hypothesis based on the one or more metrics. In some embodiments, the method further includes performing an initial analysis. In some embodiments, the method further includes modifying the key phrase based on the initial analysis. In some embodiments, the method further includes performing consecutive analysis based on the key phrase and available data. In some embodiments, the method further includes generating a local decision This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 3C illustrates a table for creating a taxonomy for conveying jamming, in accordance with one or more embodiments of the disclosure;

FIG. 3D illustrates a table containing metrics, key phrases and sentences utilized in deep learning for determining a location of a jammer, in accordance with one or more embodiments of the disclosure;

DETAILED DESCRIPTION

Figure 1:
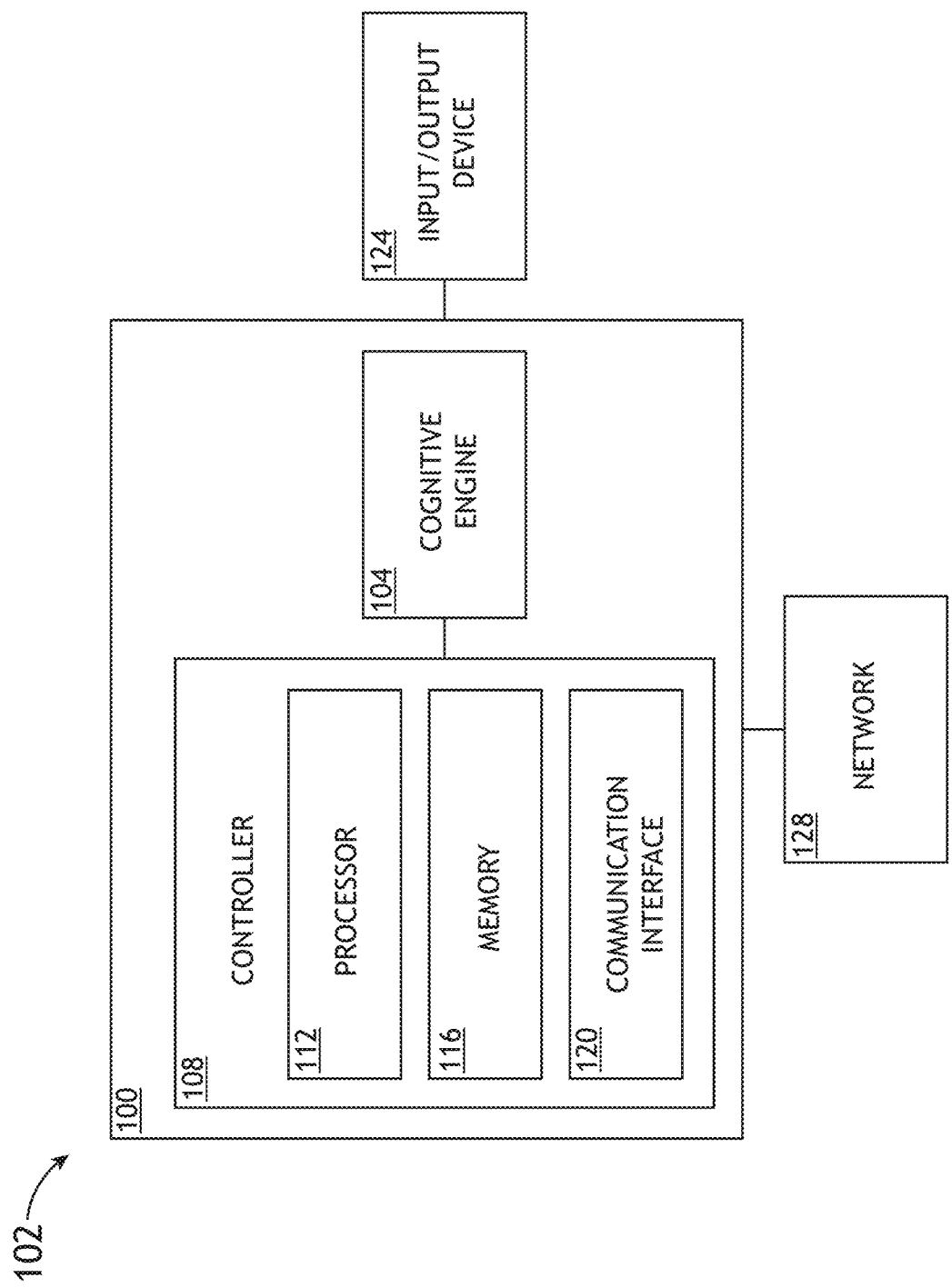
FIG. 1 is a block diagram illustrating a system 100 for performing AI-mediated tasks that include installation of AI taxonomy, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A method and system for developing an AI taxonomy is disclosed. In particular, embodiments in this disclosure disclose a method and system for developing a battlefield AI taxonomy. The method includes collecting metrics from packets received from nodes within a network, and fuses these metrics to form keywords, key phrases, and sentences that can ask and answer hypothetical questions, such as whether jamming is occurring in a local area, or if a denial-of service (DOS) attack is active. The method and system may be utilized within any type of communication scheme, including those listed above within the "cross reference to related applications" paragraph, which have been incorporated by reference in their entirety.

FIG. 1 is a block diagram illustrating a system 100 within an environment 102 for performing AI-mediated tasks that include installation of AI taxonomy, in accordance with one or more embodiments of the disclosure. The system 100 may operate as a standalone computer processing apparatus, or may include, or be a component of, a communication device. For example, the system 100 may be configured as a cognitive radio that includes a transceiver that can intelligently detect available communication channels and operate within the available communication channels. The system 100 includes a cognitive engine 104 configured to carry out the installation of AI taxonomy, and may include one of more of software, hardware, and firmware. The system further includes a controller 108 configured to facilitate the functions of the system 100 and the cognitive engine 104.

In embodiments, the controller 108 includes one or more processors 112, a memory 116, and a communication interface 120. The one or more processors 112 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors may include any device configured to execute algorithms and/or instructions (e.g., program instructions stored in memory). In one embodiment, the one or more processors may be embodied as a desktop computer, mainframe computer system, workstation, image computer, parallel processor, networked computer, or any other computer system configured to execute a program configured to operate or operate in conjunction with the system 100, as described throughout the present disclosure. Moreover, different subsystems of the system 100 may include a processor or logic elements suitable for carrying out at least a portion of the steps described in the present disclosure. Therefore, the above description should not be interpreted as a limitation on the embodiments of the present disclosure but merely as an illustration.

The memory 116 can be an example of tangible, computer-readable storage medium that provides storage functionality to store various data and/or program code associated with operation of the controller 108 and/or other components of the system 100, such as software programs and/or code segments, or other data to instruct the controller and/or other components to perform the functionality described herein. Thus, the memory can store data, such as a program of instructions for operating the system 100 or other components. It should be noted that while a single memory 116 is described, a wide variety of types and combinations of memory 116 (e.g., tangible, non-transitory memory) can be employed. The memory can be integral with the controller, can comprise stand-alone memory, or can be a combination of both. Some examples of the memory 116 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD)

memory, magnetic memory, optical memory, universal serial bus (USB) memory devices, hard disk memory, external memory, and so forth.

The communication interface 120 can be operatively configured to communicate with components of the controller 108 and other components of the system 100. For example, the communication interface 120 can be configured to retrieve data from the controller 108 or other components, transmit data for storage in the memory 116, retrieve data from storage in the memory 116, and so forth. The communication interface 120 can also be communicatively coupled with controller 108 and/or system elements to facilitate data transfer between system components.

In embodiments, the system 100 may include an input/output interface 124 configured to input or output data and/or data signals from the system. For example, the input/output interface 120 may be configured as a transceiver configured to send and receive electromagnetic signals. For instance, the input/output interface may be configured to receive a radio signal, and send the radio signal or digitized radio signal data to the cognitive engine 104. The cognitive engine 104 may then generate a response to the inputted radio signal, which is then outputted through the transceiver (e.g., to one or more nodes of a network 128. In embodiments, the system 100 may be included within one or more, or all, nodes of the network 128

In the interest of clarity, it should be noted that the system 100 may be included within one or more nodes of the network 128, and that a node within the network 128 that contains the system 100 may be considered an AI entity. Therefore, all AI entities are nodes that contain a system 100 within the network 128, and any nodes mentioned herein may include the system 100 (e.g., one or more nodes may not include the system 100). For instance, the network may include a plurality of AI entities, each containing a system 100.

The network 128 may be configured as any type of wireless, wireline, or hybrid network, including but not limited to an ad hoc network. For example, the network 128 may be configured as a mobile ad hoc network or MANET. The network 128 may be configured with any type of topography including but not limited to ring, point-to-point, star, tree, mesh, and hybrid topographies. For example, the network 128 may be configured as a hierarchical tree network. In another example, the network 128 may be configured as a hierarchical hybrid network.

Figure 2:
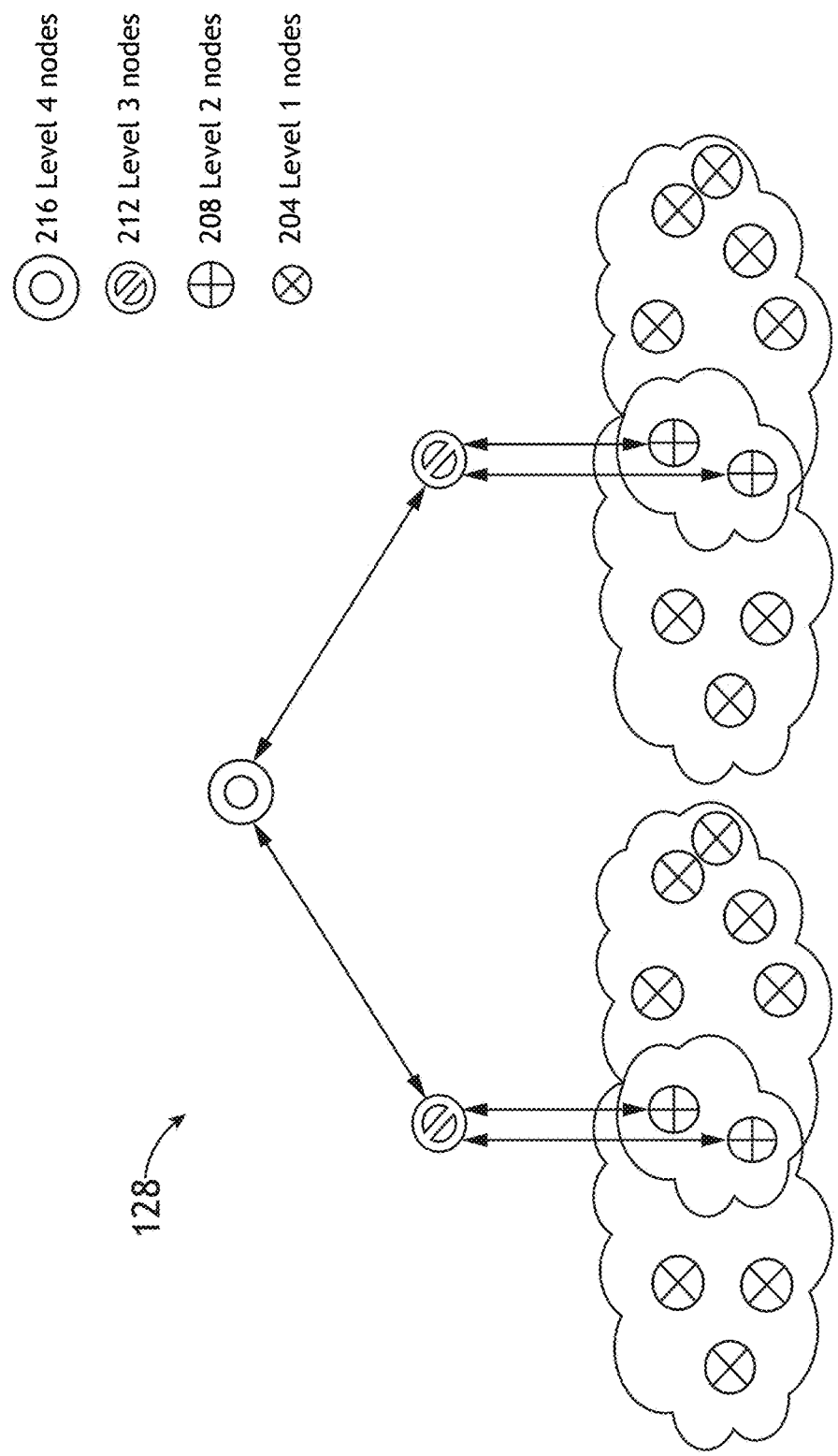
FIG. 2 is a diagram illustrating a network 128 in communication with the system 100, in accordance with one or more embodiments of the disclosure.

FIG. 2 is a diagram illustrating a network 128 in communication with the system 100, in accordance with one or more embodiments of the disclosure. The network 128 contains multiple levels of nodes that communicate between peer cognitive engines 104 and in the context of a cognitive engine hierarchy. For example, the network 128 may include level 1 nodes 204, the lowest level of node in the network 128. For example, in a system configured as a battlefield AI, the level 1 node 204 may be referred to as a "soldier node". Level 1 nodes 204 may be configured to communicate with level 2 nodes 208 (e.g., "lieutenant nodes"). Level 2 nodes 208 may be configured to communicate with level 3 nodes 212 (e.g., "colonel nodes"). Level 3 nodes 212 may be configured to communicate with level 4 nodes 216 (e.g., "general nodes"). The network 128 may be configured with fewer or greater numbers of node levels. In some instances, the levels may communicate to one or more nodes within their respective level.

Each level of nodes within the network may be configured with different rules, objectives, and configurations. For example, level one nodes 204 operate within the same network 128 where distributed communication is achievable. These level one nodes 204 may include individual soldiers in the field operating cognitive radios as well as sensors, unmanned ground vehicles, and unmanned aerial vehicles. Level 2 nodes 208 may be configured as part of a lower echelon of the network 128 (e.g., along with level 1 nodes 204), but can communicate with a higher echelon level 3 node 212. For example, in a battlefield AI system, the level 3 node 212 configured as, or located at, a forward operating base (FOB) that is deployed to execute a mission. Level 3 nodes 212 may also be configured to communicate to a top-level node (e.g., level 4 node 216) configured as a command and control (C2) node, representing the highest structure entity. The exchange of information between cognitive engines 104 within the distributed and hierarchical network 128 requires a taxonomy to facilitate communication.

As information travels upward through the command structure of the network 128 (e.g., from level 1 nodes 204 to level 4 nodes 216), there is an increase in accumulated knowledge, as well as increased processing power associated with the cognitive engines 104 of higher-level nodes. In this manner, overall network 128 within (e.g., within a battlefield) may be considered as a "brain", with the highest-level nodes (e.g., level 4 node 216) that make command and control decisions considered as the frontal lobe of the brain, having an ability to control or override other parts or nodes of the brain (e.g., each node characterized as a neuron within the brain). For example, the network 128 may include decisions, rule sets, configuration parameters, and other software characteristics that flow downward through the command hierarchy, wherein the higher-level nodes are able to override decisions, rule sets, and policies as determined by lower-level nodes. For instance, higher level nodes are configured to perform with an increased command role, increased cognition, increased bird's-eye-view, and increased decision weight than lower-level nodes. Although a decision by a lower level can be overridden by a higher-level node's decision, this lower-level node is still autonomous, and decisions by the lower-level node hold when they are not overridden. Although the system 100 may be configured to run autonomously, one or more levels within the network hierarchy may be configured to allow human-in-the-loop interactions, allowing a user to modify decisions made by the system 100.

In embodiments, the system 100 is configured to build a taxonomy within the network that allows the communication of a complex language for use by and between cognitive engines 104. In general, the cognitive engines generate vectors in a defined multi-dimensional space in order to create a rich set of communication sentences (e.g., emulating human language) and use vector analysis to correct errors that can occur in wireless communications in order to recover the original vector. This strategy is analogous to a human brain making sense of what is heard when the speaker makes pronunciation or grammatical errors.

At the base level of taxonomy development is the defining of a metric. Metrics measure specific characteristics of a signal or data unit sensed by a node. These metrics are then combined to form vectors. For example, in an analogous comparison to human language, vectors are the equivalent of phrases and sentences in human languages while metrics are the equivalent of letters or key words. Within the system 100, metrics measure a sensed value, which can be combined to form a word and a phrase (that is, a phrase uses more than one metric and then fuses them to relay knowledge to peer and hierarchical entities).

In embodiments, the system 100 may be used to develop an AI taxonomy within a battlefield environment. For example, the system 100 may be used to determine whether an environment is being jammed by an adversary (e.g., one of many types of adversarial actions within an electromagnetic warfare (EW) environment). For instance, the system 100 may hypothesize if the environment is being jammed and collectively turn these hypotheses into a binary decision (e.g., "YES", the environment is jammed, or "NO" the environment is not jammed). By hypothesizing the presence of a jammer (e.g., through fusion of one or more metrics), the system 100 may leverage the collective intelligence and observations from multiple nodes, resulting in increasingly accurate decision-making.

Figure 3A:
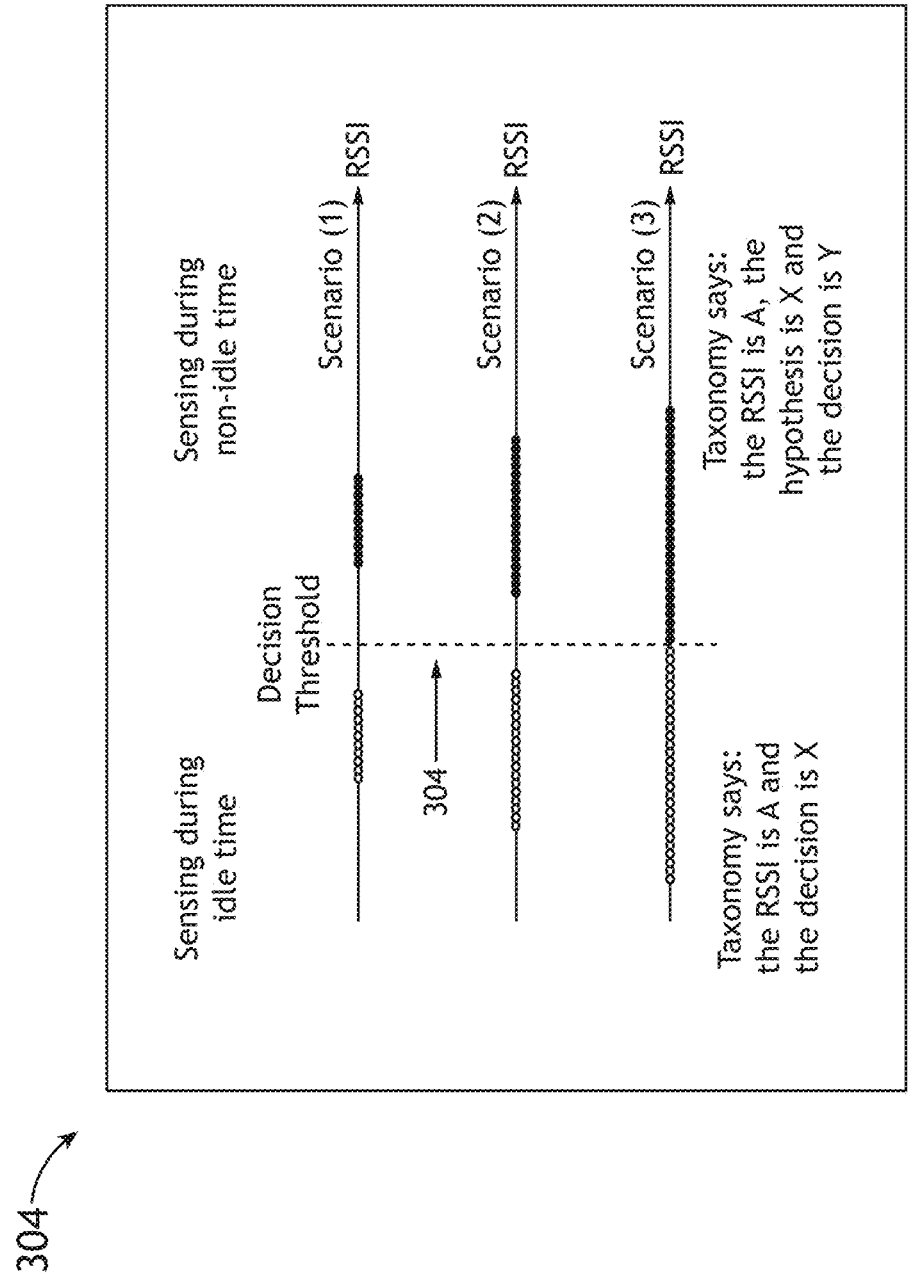
FIG. 3A-B are graphs illustrating the generation of keywords for a taxonomy, in accordance with one or more embodiments of the disclosure.
Figure 3B:
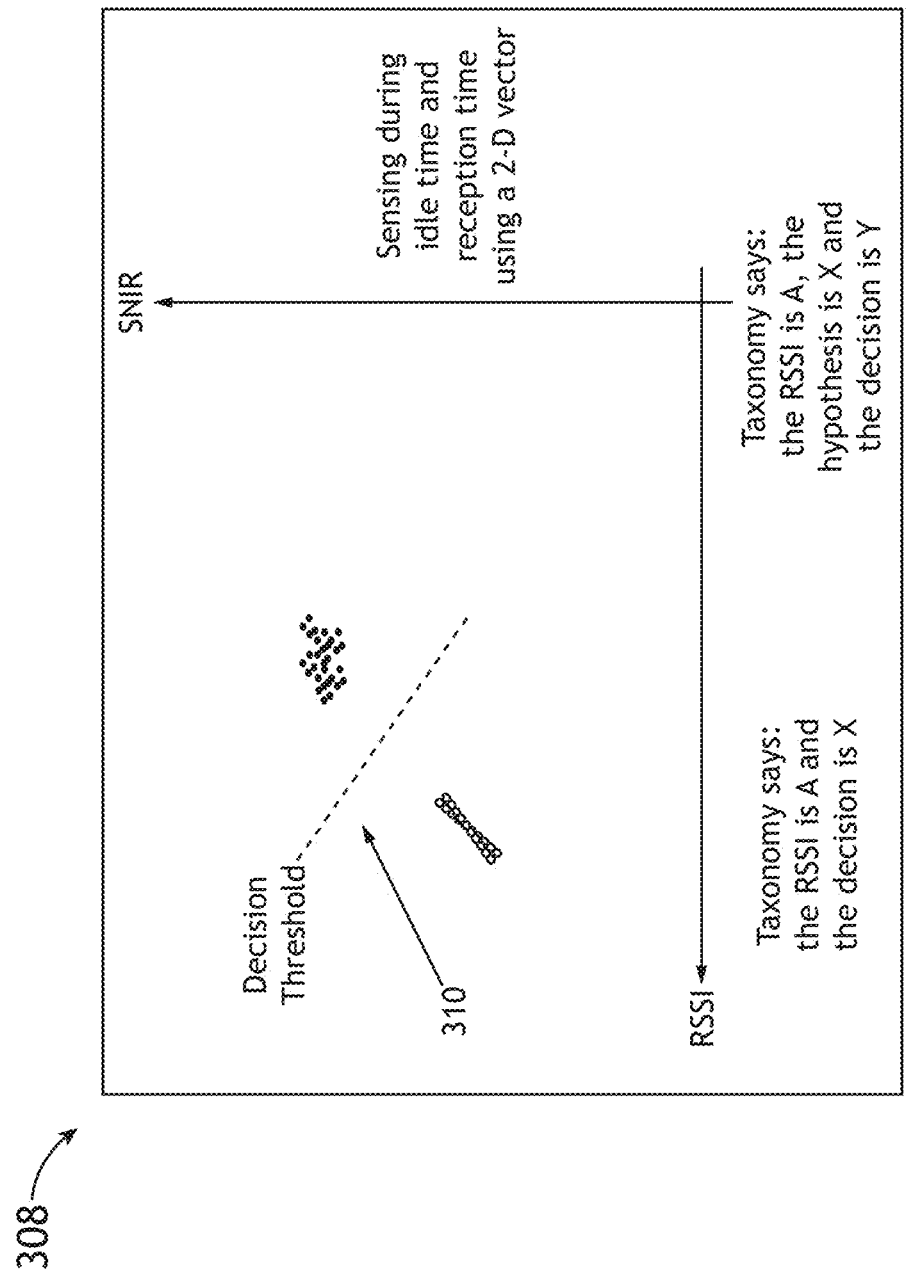

FIGS. 3A-B graphs (graph 304 and graph 308 for FIGS. 3A and 3B, respectively) illustrating the generation of keywords for a taxonomy (e.g., a first key word in particular), in accordance with one or more embodiments of the disclosure. As shown in FIG. 3A, a node can collect the energy on its antenna (e.g., on the transceiver) during idle time (e.g., when there is no reception). This electromagnetic energy collected by the transceiver at this time can then be turned into a metric known as the Received Signal Strength Indicator (RSSI). The RSSI metric can indicate the noise level, noise floor level, of a particular channel. In environments where wireless communications may be jammed, the RSSI metric modified via the cognitive engine 104 so as to differentiate between normal noise (e.g., Additive White Gaussian Noise—AWGN) and jamming. RSSI can also be collected during reception and under normal circumstances, in which case the RSSI represents both signal and noise.

With the system 100, a node can define a sampling time and collect energy on the antenna during this sampling time (e.g., which may be in the order of microseconds or even nanoseconds) and collect multiple samples using a moving average window to smooth the effect of any spikes that are anomalies. In embodiments, the system 100 adapts the sampling time and the moving average window time dynamically, so that taxonomy help create deep learning that reflects the environment accurately. For example, if a communication signal use spread spectrum and the chip code (e.g., spreading code) is adaptive, the dwell time (e.g., how long sample energy is collected) should increase with increased spreading code and decrease with decreased spreading code. This relative increase in dwell time is required to determine an indication of the signal energy needed for comparison to noise.

Referring to FIG. 3A, three distinctive scenarios for determining a measured RSSI metric. On the left-hand side of the decision threshold line 310 (e.g., the dotted and vertical line), the collected low energy measurements may represent noise (e.g., or noise plus jamming). On the right-hand side of the decision threshold line are the instances of measuring RSSI when the node is also decoding a received signal. As shown in FIG. 3A, when noise is low (scenario 1) the measurements of noise alone are clustered to the left of the Decision Threshold line and measurements of signal and noise are clustered to the right. Scenario 2 shows that as noise power increases, the standard deviation of the measured points increases. Scenario 3 shows that a further increase of noise power can increase standard deviation to the point that measurements of noise alone can encroach into the signal plus noise zone, and measurements of the signal plus noise can encroach into the noise only zone (e.g., the noise impact is to increase standard deviation of the measured energy levels). This decision threshold vertical line should be chosen to optimize the trade-off between obtaining a false alarm (e.g., a signal was detected when the energy was all noise) and obtaining a misdetection (e.g., the signal was not detected).

The creation of a taxonomy requires create cooperative decisions between nodes. For example, a node deciding alone is more likely to make errors, whereas cooperative learning between two or more nodes can reduce errors. FIG. 3A demonstrates two ways to create words and phrases from this RSSI metric. For example, the first word may have taxonomy indicating that the RSSI is A, and the decision is X. The letters A and X, as well as the letters B and Y below refer to random variable parameters (e.g., mean, standard deviation, and PDF types). The second word relies on cooperative learning and may indicate that the RSSI is A, the hypothesis is X and the decision is Y. The inclusion of the second word increases meaning within the decision, and can lead to better deep learning through collective and cooperative decisions.

In embodiments, the keyword and key phrases are expressed as a vector. For example, first phrase may be considered a 2-D vector (e.g., the RSSI is A and the decision is X, wherein the axes are RSSI and decision). The second phrase may then be defined as a 3-D vector (e.g., the RSSI is A, the hypothesis is X and the decision is Y, where the axes are RSSI, hypothesis (H) and Decision (D)). The 3-D vector facilitates cooperative learning that overrides individual learning and also facilitates further development of the taxonomy to indicate both local hypothesis and collective decision. The differentiation between a local hypothesis and a collective decision is critical in deep learning, particularly in the battlefield.

FIG. 3B is a graph 308 illustrating the equivalent of creating a more complex phrase or a sentence in battlefield taxonomy by adding a new dimension to a critical phrase to convey more meaning, in accordance with one or more embodiments of the disclosure. The graph 308 explains a critical concept in wireless communications that can reduce errors in battlefield deep learning. In addition to measuring RSSI, and generating the RSSI metric, the nodes also measure and generate a signal-to-noise interference Ratio (SNIR) metric, which defines is a quantity used to give theoretical upper bounds on channel capacity, or the rate of information transfer, in wireless communication systems such as wireless networks. Within AI systems, the presence of two similar metrics is known as valuable redundancy, which provides information that the deep learning within the system 100 utilizes. For example, the system may use valuable redundancy to target a critical phrase to make it a more comprehensive phrase. For instance, as demonstrated in FIG. 3B, RSSI is reported on the X-axis, and SNIR is reported on the Y-axis creating a 2-D vector instead of what would be a 1-D vector using RSSI or SNIR alone. By generating a critical phrase that is expressive of both RSSI and SNIR, the key phrase contains more meaning than a single dimension phrase.

The strategy behind the development of the graph 308 in FIG. 3B may be used to determine the presence of absence of jamming under different environments. For example, in the case where there are no transmitted signals, the measures SNIR should be zero, and any measurement of energy will be projected on the X-axis only, which is left of the decision threshold line 310. In this scenario, an environment with zero SNIR and high RSSI values would suggest the presence of jamming.

In another example, the noise variance is high (e.g., which caused confusion in FIG. 3A), and RSSI is high, but the signal energy will make the measured point in 2-D space likely to be above the decision threshold line 310. FIG. 3B demonstrates that as the noise power increases, a resultant scattering of measurement points is less likely to encroach on each other. The group of points above the decision threshold line shows 2-D scattering of SNIR measurement plots as a function of RSSI, where increased noise (e.g., without jamming) is more likely not to produce a wrong hypothesis. The increase in jamming power will likely produce plotting points in this 2-D graph below the decision threshold line 310. By modifying the reportable data from a 1-D plot to a 2-D plot, the confidence in communicating the jamming status on the environment increases.

The text below the plots in FIG. 3A and FIG. 3B shows how a sentence would be communicated using the metrics, and how improvements in sentence structure may be generated. For example, in FIG. 3A, the right-hand side uses simple sentences and the case of using taxonomy to communicate "the RSSI is A and the decision is X", which is the simplest and least accurate way of conveying the message. Relying on collective decision making (e.g., by making the node vote for decision based on the case when the majority of nodes in its network hypothesis agree on) is a step up for forming a better sentence, such as "the RSSI is A, the hypothesis is X and the decision is Y". Here, Y is based on cooperative decision making. Moving to the text below FIG. 3B, one can see that creating an intermediate phrase based on RSSI and SNIR metrics improve taxonomy. Conveying that "the RSSI is A, the SNIR is B and the decision is X" means forming a sentence based on the intermediate phrase instead of the single word. The far-right text where taxonomy expresses "the RSSI is A, the SNIR is B, the hypothesis is X and the decision is Y" is the best sentence to form in these four cases since it relied on both the intermediate phrase (using RSSI and SNIR) and the collective decision making.

In embodiments, a sentence within the taxonomy is equivalent to a vector in a multi-dimensional space. For example, first sentence, "the RSSI is A and the decision is X", added a new dimension to the RSSI dimension (the decision dimension), and the second sentence, "the RSSI is A, the hypothesis is X and the decision is Y", added two dimensions (e.g., the local hypothesis and the cooperative decision dimensions) to the multi-dimensional space. The third sentence, "the RSSI is A, the SNIR is B and the decision is X", started from a phrase (e.g., which is a 2-D phrase plotted as a 2-D vector for the RSSI dimension and the SNIR dimension) and added a third dimension (e.g., the cooperative decision direction). The fourth sentence, "the RSSI is A, the SNIR is B, the hypothesis is X and the decision is Y", started from the same 2-D phrase and added a third and fourth dimension (e.g., the local hypothesize dimension and the cooperative decision dimension).

FIG. 3C illustrates a table 312 for creating a taxonomy for conveying jamming, in accordance with one or more embodiments of the disclosure. The table summarized the process for generating the four sentences in FIG. 3A-B. Within the table 312, "H" refers to hypothesis, "D" refers to a local decision, "Dc" refers to a cooperative decision, and the equation SNIR=f (RSSI) indicates that the 2-D phrase was created before creating the vector (sentence), which states that SNIR is a function of RSSI.

Within a battlefield context, the method of creating keywords, key phrases and sentences can be used for other deep learning cases. For example, a location of a jammer can be discovered through collective deep learning. Each node can hypothesize the presence of a jammer and multiple nodes can collectively analyze jamming power and direction to pinpoint the jammer's location. The outcome of the previous communications (e.g., if all or most nodes in a network collectively decided there is a jammer) become a metric (e.g., jammer detected) to be used to form the next sentence. Comparative analysis of jamming power based on collective node locations can make each node hypothesize a place for the jammer and collective learning can turn this hypothesis into a decision for a determination of the most likelihood of the location of the jammer. The concept for developing a taxonomy for determining the location of the jammer is similar to the development of a taxonomy for determining the presence of jamming. The process initiates with a metric that is added to other metrics in new dimensions, creating an intermittent phrase that carries more meaning than a single metric. The intermittent phrase is then modified to form a sentence that increased decision accuracy. The collective hypotheses gathered via these sentences are then used to generate a collective decision.

There is no conceptual limit on how many dimensions can be considered to create a sentence. A sentence is essentially a vector in an N-dimension domain where N is adaptable. In this manner an intermittent phrase between the key word (e.g., jamming) and the sentence that explains the key word (e.g., how is the environment jammed) such that the sentence (e.g., the vector) carries more relevant information to the needs of the environment (e.g., the battlefield environment).

Figure 4A:
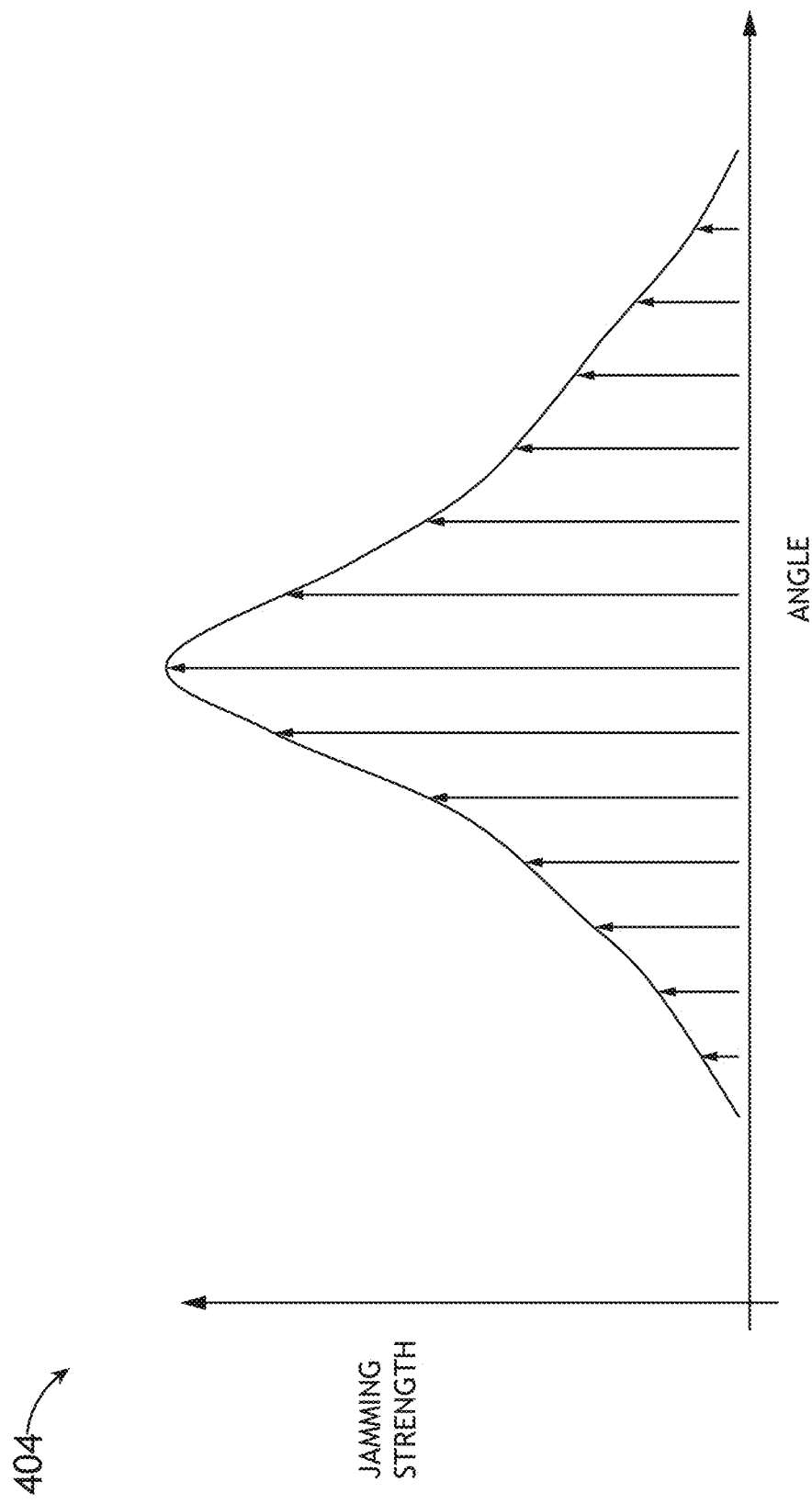
FIG. 4A is a graph illustrating jamming power as a function of reception angle, in accordance with one or more embodiments of the disclosure.

FIG. 3D illustrates a table 316 containing metrics, key phrases and sentences utilized in deep learning for determining a location of a jammer, in accordance with one or more embodiments of the disclosure. The table 316 is an extension of the jamming detection taxonomy of Table 312, facilitating the determination of a jammer location through the same taxonomy buildup (e.g., the decision may be Yes/No, Green zone/Red zone, or the location of a jammer). As in Table 312, the 2-D key phrase can plot jamming power as a function of reception angle as demonstrated as a graph 404 of FIG. 4A, which is shown in accordance with one or more embodiments of the disclosure. For example, the graph 404 can resemble discrete measurements (e.g., based on how we digitize the 360 degrees into how many degrees). Jamming power can be higher at certain reception angles than others, and these discrete measurements (e.g., jamming power as a function of angle) can be approximated to a normal distribution. In some instances, nodes communicate periodically, and at each communications instance, some angles may not be measures. For this reason, deep learning must be able to complement these measurements based on the normal distribution as illustrated in FIG. 4A, where periodic reception of this information can be used to make accurate approximations.

Figure 4B:
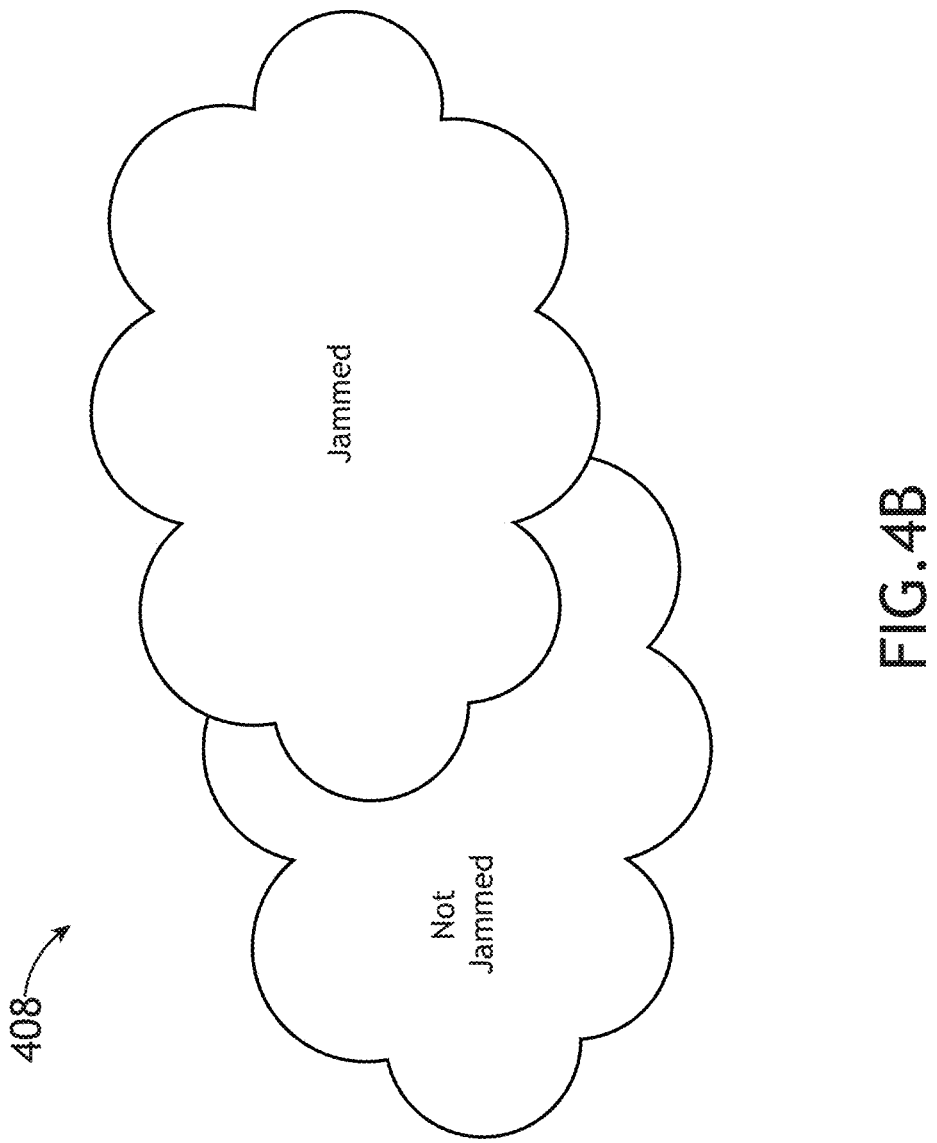
FIG. 4B is a drawing illustrating a network footprint, in accordance with one or more embodiments of the disclosure.

In embodiments, the intermediate key phrase expresses jamming power as a function of angle. In this manner, a collective decision of nodes in the same net can accurately plot a footprint of a network 128 showing who is jammed and the direction of jamming by correlating these matrices that express jamming power as a function of angle for all locations of nodes in the network 128. A drawing illustrating a network footprint 408 with jammed and non-jammed areas is demonstrated in FIG. 4B, in accordance with one or more embodiments of the disclosure.

The above two examples mirror a human expression/ through structure where a sentence may be based on a keyword, with the keyword modified or fused to a key phrase before sentence formation to add more meaning to the sentence. This deep learning progression within an environment (e.g., from keyword to sentence/vector) is important in engineering the taxonomy. This strategy facilitates deeper decision-making. For example, instead of a node deciding if it is in a jammed or non-jammed zone, the node hypothesizes being in jammed or non-jammed zones, and decides based on correlation of all the matrices of all nodes that express power as a function of angle the exact jammer location and direction of jamming.

Figure 5:
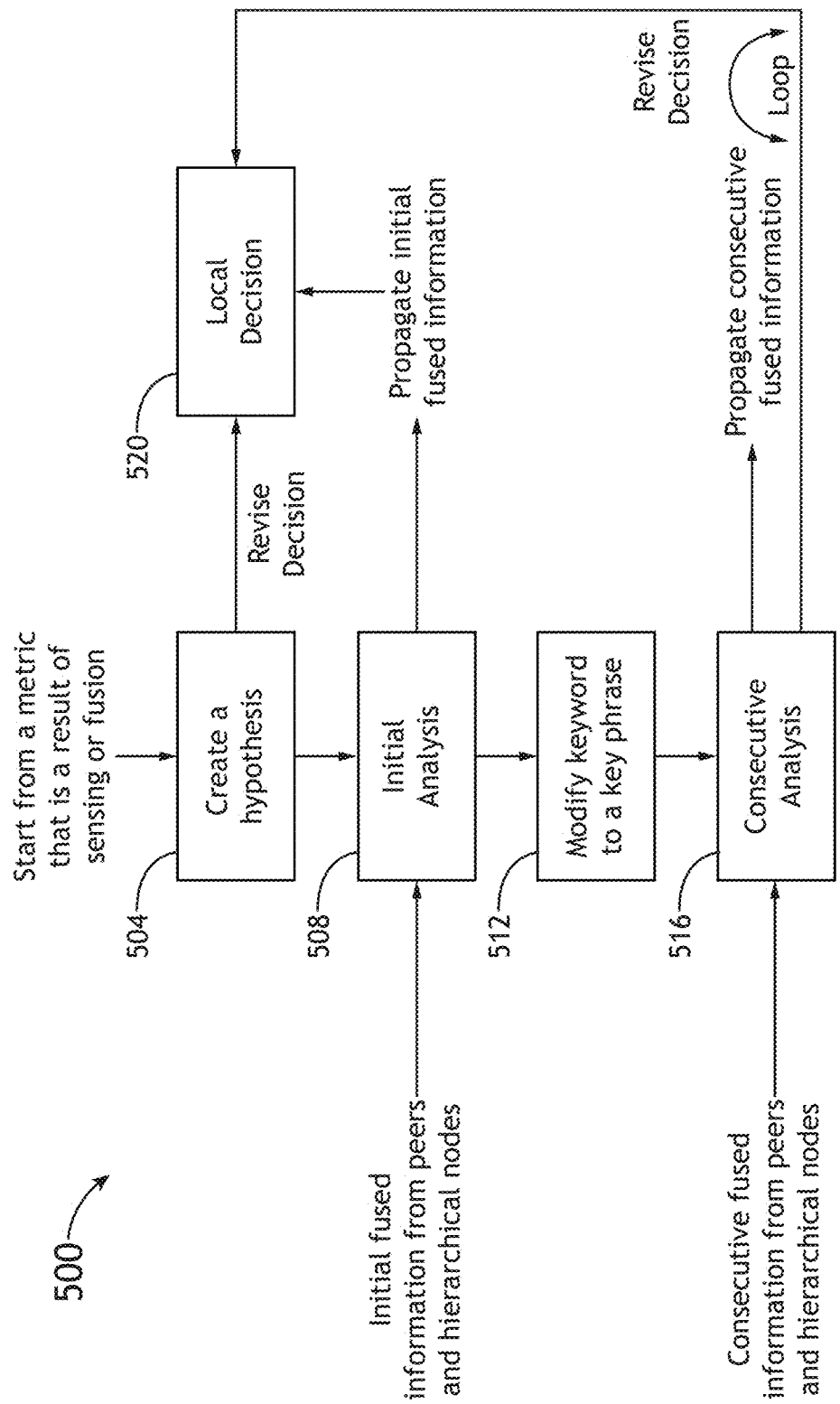
FIG. 5 is a flowchart illustrating a method for creating keywords, key phrases and propagating information, in accordance with one or more embodiments of the disclosure.

FIG. 5 is a flowchart illustrating a method 500 for creating keywords, key phrases and propagating information, in accordance with one or more embodiments of the disclosure. While a node propagates its own analysis results (fused information) to peer and hierarchical nodes the node also receives fused information from these peer and hierarchical nodes. FIG. 5 demonstrates an important aspect of deep learning in the environment (e.g., battlefield). For example, a threat must be detected, confirmed, monitored and remedied before the threat is marked as gone. For instance, the metric must indicate a consistent threat through cooperative learning in order to trigger other entities to address it.

In some embodiments, the method 500 includes a step 504 of creating a hypothesis (e.g., based on the one or more metrics). For example, one or more nodes in the network 128 may hypothesize the existence of jamming in the environment. In some embodiments, the method 500 further includes a step 508 of performing an initial analysis based on available data. For example, the available data that has propagated through the network 128 (e.g., possibly based on keywords and/or key phrases) will be collected and initially analyzed for the presence of jamming. The available information may also include initially fused information from peer and hierarchical nodes.

In some embodiments, the method 500 further includes a step 512 of combining or modifying a keyword to a key phrase based on the initial analysis (e.g., modifying the key phrase based on the initial analysis). For example, if more than one node in a network 128 creates an equivalent hypothesis or local decision (e.g., that there is a potential for jamming), nodes may then modify or fuse the keyword into a key phrase and propagate more information in reoccurring communications in order to confirm if jamming truly exist.

In some embodiments, the method 500 further includes a step 516 of performing consecutive analyses based on the key phrase and available data. For example, a node may receive consecutive fused data from peer and hierarchical nodes that are analyzed and reanalyzed to create an accurate assessment of the environment.

In some embodiments, the method 500 further includes a step 520 of generating a local decision. For example, the local decision may be a confirmation of the existence of jamming in the environment. Depending on available data and resources, the step 520 may be accomplished once the hypothesis is generated (e.g., step 504), after the initial analysis (e.g., step 508), or after consecutive rounds of analysis (e.g., step 516). Once executed, the method 500 remains active until the goal is reached. For example, once the method has determined that the network is jammed, each node, via an initiated thread, will continue to monitor the condition that the network is jammed via the method 500 until the threat is remedied.

Referring to FIGS. 3C to 5, two or more threads may operate concurrently within each node. For example, while an initial thread corresponding to table 312 (e.g., regarding the existence of jamming) is performed via method 500, a new thread corresponding to table 316 (e.g., determining the location of the jammer) may be created and performed via method 500. Both threads expire only once the jammer is remedied, and they will only be initiated if cooperative learning determines the existence of another jammer.

In some embodiments, sentences communicated between nodes may be configured as vectors in an N-dimensional space that is transformed and correctable. Some environments, such as a battlefield environment, need a specific capability that may not be required in some applications of more generalized AI applications. For example, a battlefield environment may require sentences to be hidden or encrypted such that an adversary intercepting a packet carrying these key phrases and sentences will not be able to discern meaning. Furthermore, while more generalized AI applications may need to correct a corrupt sentence to match an expected sentence, battlefield AI needs to make similar correction while being able to hypothesize or differentiate between a packet that is corrupt due to communications interference versus a packet that is corrupt through a Denial of Service (DoS) or other cyber-attack.

In some embodiments, communications between nodes may be configured as an encrypted vector. For example, a communication between nodes using a vector can use a form of encryption that is both dynamic (e.g., can be unique with each packet based on an encryption key) and can be hard for the enemy to decrypt. One approach is to use a vector transformation domain (e.g., via an encryption key) to encrypt the packet carrying the vector information before sending over the air, and then the receiving node reverses the transformation of the vector to its original domain.

In some embodiments, the vector is transformed via a Lorentz transformation, which can be adapted to any N-dimensional vector. The Lorentz transformation has unique capabilities that can be leveraged for battlefield AI applications such as the ability to make the direction of the vector appear arbitrary to the enemy and the ability to change the unit vector for each dimension. These capabilities increase the effort required by the enemy to decipher the information carried in AI communications. For example, the y function of the Lorentz transformation, which may be implemented to facilitate hiding the vector direction, and the n unit vector of the Lorentz transformation, which may be implemented to facilitate hiding the value in each direction, is utilized. Together, these two functions of the Lorentz transformation can facilitate AI communications encryption that may frustrate an adversary, particularly if this encryption is used in a dynamic manner. For example, the Lorentz transformation may conceal AI communications by modifying AI communication packets to appear as random noise to an eavesdropping adversary.

In some embodiments, the use of vectors to express AI communications can be combined with the use of decision zones to overcome errors introduced to a packet expressing a vector. Decision zones utilize methods for projecting the received vector to the closest known vector (e.g., of all communication vectors existing in a code book of vectors) such that the alteration of a few bits due to errors can be overcome. For example, AI communications, particularly battlefield AI communications, may involve a projection of a corrupted vector to its closest vector in a code book of vectors. In this manner, the receiving node will be able to differentiate between errors that can happen due to communications over the air, and errors that can be introduced from an adversarial denial-of-service (DoS) attack (e.g., a cyber-attack in which an adversary seeks to make a machine or network resource unavailable to intended users by temporarily or indefinitely disrupting services of a host connected to the internet. For example, a DoS may include an adversary sinking a network communication packet and replacing it's the packet payload with a random information to deny nodes (e.g., AI entities) making use of their discovery. In the battlefield environment, DoS attacks in wireless communication are commonplace, as cognitive engines 104 engaged in EW warfare will be at the cipher text side of a node (not the plain text side), therefore, the packet payload my not have a Communications Security (COMSEC) encryption and the enemy may be able to identify a control packet initiated at the cipher text side and randomize its payload to create a DoS attack.

In some embodiments, the cognitive engine 104, or the network 128 of cognitive engines utilize a correlation function to correlate a received vector to a code book of vectors at the receiving node to determine the closest vector in the code book. In particular, the correlation function by the system 100 may produce more than one result. For example, the system 100 may be able to differentiate via the correlation function whether deviations between a corrupted vector and a vector in the code book are small and not persistent. In another example, the correlation function may determine or suggest that DoS attack exists because the deviation from the corrupted vector to the code book vectors is large and persistent.

When one or more nodes hypothesize the presence of a DoS attack, the DoS attack become a keyword as explained above. This key word can turn to a key phrase by adding an array of measurements. This array of measurements will express the deviation from the code book vectors for a window of consecutive receipts of different vectors. The process explained above in and further described in tables 312, 316 for discovering jamming and discovering the location of a jammers can be replicated for the discovery of a DoS attack. It should be noted that if vector transformations using Lorentz transformation encryption are used, DoS attacks on AI communications may create a random vector and the correlation with the code book of vectors will produce a result that reflects correlation with a random vector (e.g., high and persistent deviation from all entries in the code book). For cognitive engines 104 to determine presence of a DoS attack, they may execute programs similar to the process of discovering a jammer. For example, a table representing taxonomy development for DoS detection, may look similar to table 316, with the last line on the table including the terms "Dc=Yes; Correlation [i]=A [i]; H=I/NI; D=lat, long, alt", wherein the Dc is the collective DoS decision (e.g., yes), the A[i] is the correlation result as a function of reception events (e.g., in array form), the hypothesis can be I (e.g., impacted) or NI, not impacted, and the decision (D) may include a traced location defined by latitude, longitude, and altitude.

Figure 6:
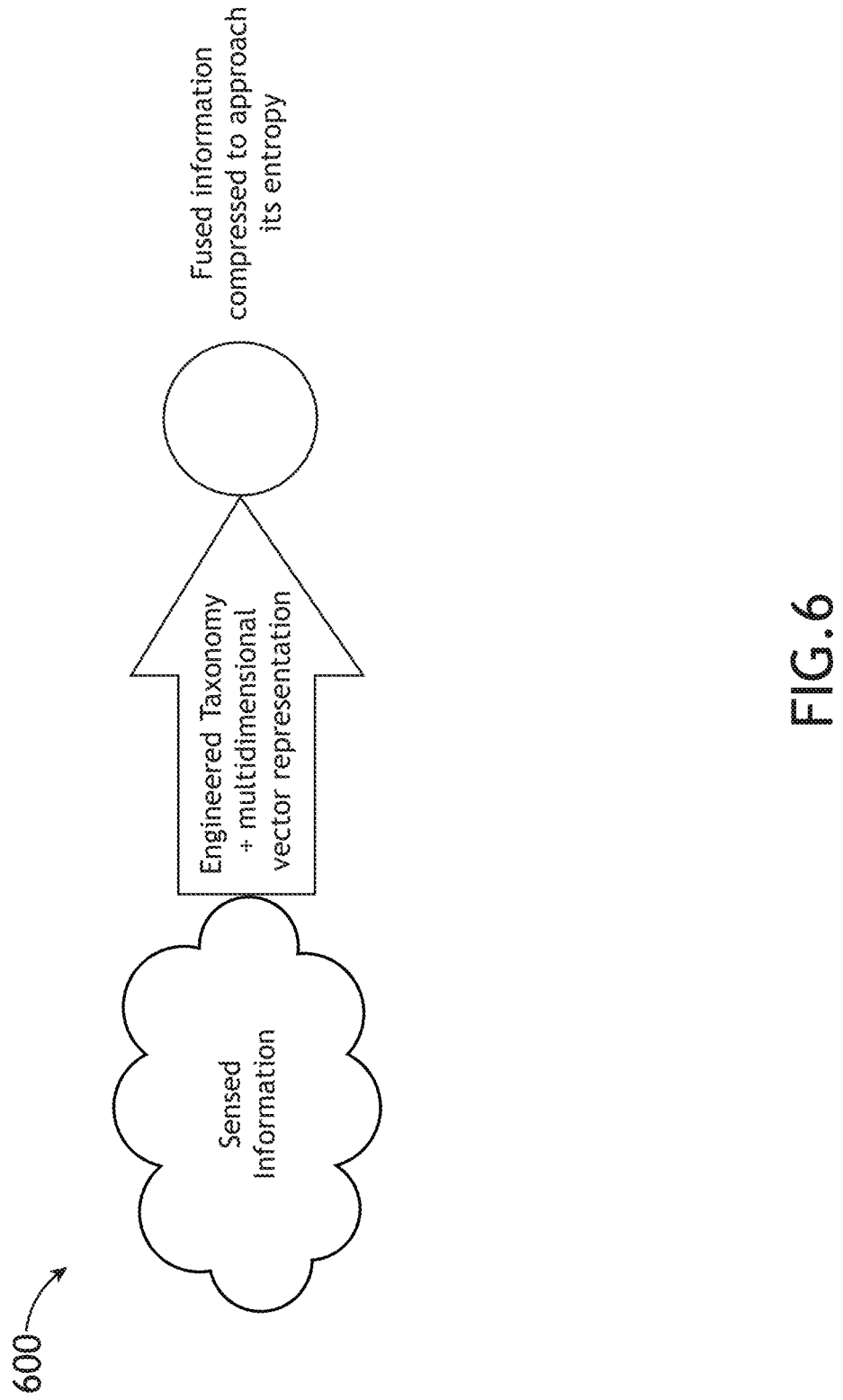
FIG. 6 is a flow diagram illustrating the process 600 of creating entries in a communication code book, in accordance with one or more embodiments of the disclosure.

FIG. 6 is a flow diagram illustrating the process 600 of creating entries in a communication code book, in accordance with one or more embodiments of the disclosure. For example, sensed information may be used to create metrics, metrics may be transformed or combined to form keywords, keywords may be transformed or combined to form key phrases, and key phrases may be transformed or combined to form sentences. The communicated sentences are then represented as vectors in an N-dimensional vector space. The creation of vectors may involve data compression processes that attempt to make communication between nodes approach the communication entropy. It is noted that efforts towards approaching the communication entropy should be balanced, because error propagation increases as compression increases. Therefore, AI taxonomy design must consider approaching communication entropy but avoid reaching this entropy to prevent error propagation. The vectors expressed as a code book of vectors are configured to allow AI entities to perform correlations between corrupted vector and code book vectors, and be able to distinguish between transmission (e.g., over-the-air) errors and DoS attacks. For example, the code book may be designed such that minor errors from over-the-air communications can produce high correlation with one of the code book entries (e.g., a corresponding entry) while a randomization of packet payload will produce random, low correlation results with all of the code book entries. For instance, communication entropy can be considered in engineering the code book entries where over-the-air errors are likely to affect a small cluster of bits corresponding to one, two or three coordinates of the vector while randomization will create a cluster of errors that affect all the vector coordinates.

The modulation and error control coding of the lower layer should be considered in this engineering of the code book entries. One must understand the impact of the over-the-air error control coding failure on an AI packet. If the failure is likely to create a cluster of erroneous bits (e.g., 16 consecutive bits), one may choose to express each vector coordinate with a 16-bit value. If the cluster of erroneous bits is likely to be 32 bits, one may choose to express each vector coordinate with a 32-bit value. This aspect of engineering the AI taxonomy will help the correlation function explained above to discover DoS attacks while attempting to make the expression of the vector (the sentence AI entities exchange) as compressed as possible (approach communications entropy).

In some embodiments, the system 100 is configured to measure closed system entropy. For example, some environments, such as a battlefield, may be considered a closed system that is stable when there are no active threats (e.g., EW warfare events). Nodes (e.g., AI entities) communicate periodic information and the engineered taxonomy facilitate the nodes to conclude that there are no outside events (e.g., DoS attacks) affecting the closed system. In some embodiments, the system 100 will update (e.g., consecutively update) at least one of a metric, a keyword, a key phrase, or a sentence based on received data (e.g., one or more AI packets). For example, one of the updated keywords, key phrases, or sentences, may be configured to identify if an electromagnetic attack is active.

Figure 7:
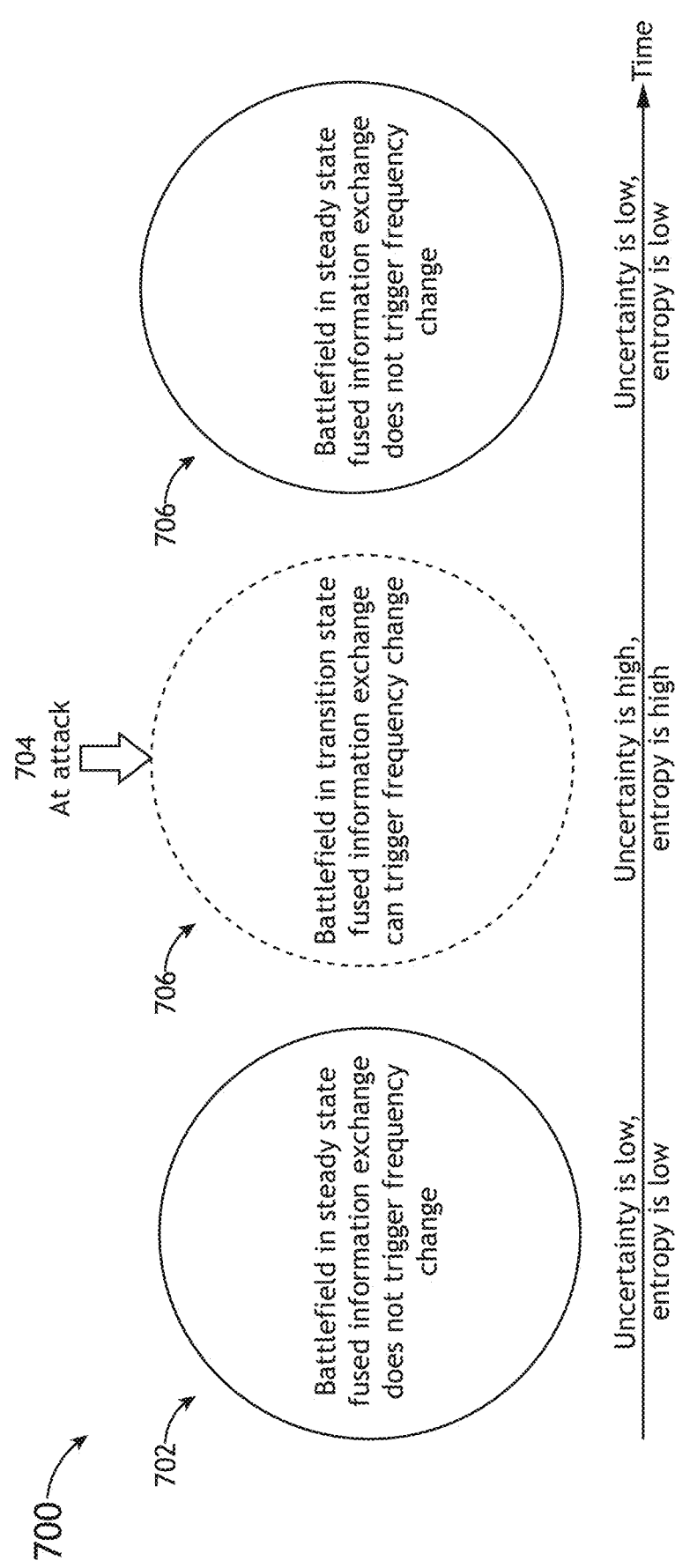
FIG. 7 is a diagram illustrating a timeline for determining changes in entropy of a closed system during an electromagnetic warfare attack, in accordance with one or more embodiments of the disclosure.

FIG. 7 is a diagram illustrating a timeline 700 for determining changes in entropy of a closed system during an EW attack, in accordance with one or more embodiments of the disclosure. At the initial closed system state 702, where no EW attacks have been mounted, the network environment is configured as a steady state. When an EW attack 704 is added to this system, the network environment becomes an unstable network state 706. For example, networks 128 configured with AI entities designed to discover and remedy external events will transform the environment to the unstable network state 706 for some period of time before it reverts to an end-steady state 706.

Figure 8:
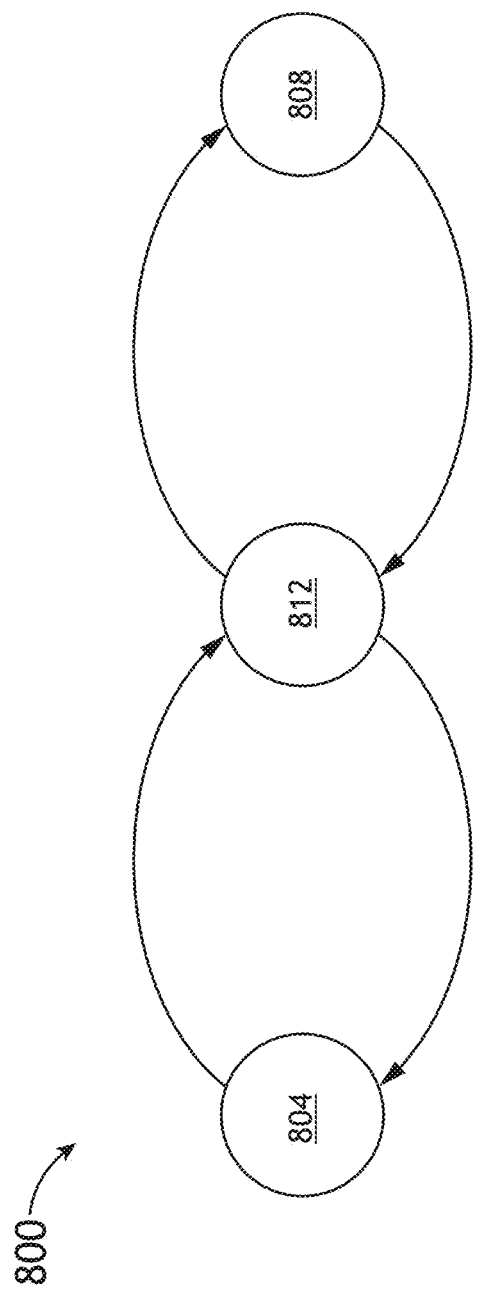
FIG. 8 illustrates a diagram describing an oscillation of a closed system between a stable state and an unstable state, in accordance with one or more embodiments of the disclosure.

FIG. 8 illustrates a diagram 800 describing an oscillation of a closed system between a stable state 804 and an unstable state 808, in accordance with one or more embodiments of the disclosure. The diagram 800 is configured as a linear 3-state Markov Chain. For example, the closed system is configured as the stable state 804 when its entropy is low. When entropy increases, such as during an EW attack, the closed state is configured as the unstable state 808. As the EW attack is remedied, the closed state reverts to a stable state 804 with low entropy. The stable states 804 and unstable states 808 are determined by cognitive engines 104 within nodes of the network 128 (e.g., during jamming or DoS attacks), which may also work to remedy the impact of the threats and bring the closed system back to stable state 804. The time it takes to bring the closed system back to the low entropy state is a metric that is used by the AI entities to evaluate their performance. If the AI entities take very long time to remedy the external event, they need to adjust code/operating parameters to reduce this time. If the AI entities take a very short time to remedy the external event, but cause oscillation (e.g., the system goes to the stable state for only short time for the AI entities to discover that they did not remedy the external impact properly and jump back to the unstable state), the AI entities can adjust code/operating parameters to increase the transition state time (e.g., in an intermediate state 812) but assure a lasting remedy. In some embodiments, the closed system is configured as a 2-state Markov chain (e.g., having not intermediate state 812).

The complexity of the AI taxonomy may be expanded to accommodate more state types. For example, instead of utilizing a 3-state Markov chain model as shown in FIG. 8, the network 128 may rely on a four-state Markov chain model. For example, the Markov chain model may use more than one intermediate state 812, which may allow a threat to be discovered and elevated gradually and addressed gradually to prevent the system 100 from causing oscillation of decisions in the battlefield.

In some embodiments, the system 100 is configured to spawn new software to address a newly learned aspect, analogous to human brain rewiring and expansion of neurons during the learning process. For example, a software spawning event may initiate through finding a keyword, followed by a key phrase, followed by creating a new sentence (e.g., updating the vector space to add a new sentence to the vectors' code book), which can be a driver behind creating or spawning new software. AI software may be initially configured as skeleton software, with each node spawning a new thread using the skeleton software to start the analysis step 508

Software development for AI must follow different concepts from conventional software development in order to achieve deep learning and adapt to the different deployment needs without developing new software. AI software essentially starts with a skeleton code set that can spawn new software and increase the cognition of the deployed system 100 without the need to develop new software.

In embodiments, software development for AI may utilize the method 500 for creating keywords, key phrases and propagating information in addressing threats (e.g., determination of jamming, determination of the location of a jammer, and determination and termination of DoS attacks that alter control packets or packet contents). For example, the network 128 may suffer a DoS attack that floods the system with packets, wherein the AI is configured to address the cipher text side where an adversary can sniff packets and find the cipher text addresses of all the nodes in the network 128. The adversary maybe be able to create DoS attacks that flood the network 128 with fake packets that have the correct cipher text source/destination addresses. To address this, the system 100, via nodes in the network 128, may discover that the network is compromised (e.g., that most of the packets a node receives are meaningless, such as missing a preamble). The system may also determine other typical metrics can also indicate the presence of flooding DoS attacks such as delay (e.g., higher delay may mean that the wireless networks is flooded). If this problem is discovered, and the system 100 determined that the problem is not one of the three problems (e.g., jamming, jamming location, DoS attacks through sniffing) identified so far, the system 100 will update its software to solve the new problem. For instance, the cognitive engines 104 will spawn new software to learn and address these challenges with little or no human-in-the-loop.

For addressing the flooding attack as detailed above, the AI entities within the network 128 need to first create a new hypothesis. This may be introduced through the level 4 node 216 (e.g., command and control), which may have a human-in-the-loop that suspects this type of DoS attack, or the level 4 nodes may select from a set of possible attack hypothesis that may occur in different deployments. The level 4 node may then propagate to the nodes the hypothesis (e.g., DoS attack through flooding) and metrics (such as ratio of decoded packets to received packets or network delay) to compare against thresholds to hypothesize the DoS attack presence. The nodes receiving the hypothesis will then hypothesize the presence or absence of a DoS attack through flooding. New threads can be spawned with a new keyword, a new key phrase or a new sentence. Because the command-and-control aspects of the level 4 nodes 216 have propagated to each node the metrics to compare and the thresholds, the nodes can create a new software "switch statement" in the newly spawned thread to compare the measured metrics against the thresholds it received from the level 4 nodes and use the same process it used for the other metrics to merge the local hypothesis with fused information received from peer and hierarchical nodes in the analysis steps 508. For example, the analysis steps 508 may include a vote for the majority hypothesis.

The step of turning a keyword into a key phrase can also be done through automated software, since the nodes have knowledge of the array to use to create the new dimension that turns the keyword into a key phrase. The new hypothesis can expand the key word to a key phrase where the receiving node adds the measured metrics as a function of the different transmitting nodes. For example, delay, and ratio of encoded packets to received packets, are measured by each receiving node (e.g., an array index is the transmitting node unique identifier). Once nodes spawn and run software that performs these measurements, method 500 can move to the consecutive analysis step 516, wherein the fused information is propagates based on the key phrase not the key word. The analysis for discovering the location of the entity that is creating the flooding DoS attack may be similar to the analysis that finds the location of the jammer, as detailed above. AI entities may perform parallel analysis (e.g., the prospect of the attack from each node's point of view with respect to the other nodes) to discover the direction of the DoS flooding attack.

The software development process may further include classes and inheritance between classes where a completely new thread with parent child relations between objects is spawned in real-time using a new key word, key phrase and/or sentence that adds new dimensions to the communicated vector. In addition to these threads, one or more modules may be developed that perform different comparative analyses. For example, the comparative analysis may include finding the direction of an attack (e.g., regardless of what the attack is) based on how each node sees the attack and how the attack compromises each communication between a pair of nodes. In another example, the skeleton software may be configured to spawn new routines to measure the duration the system 100 or network 128 takes to address a threat.

Figure 9:
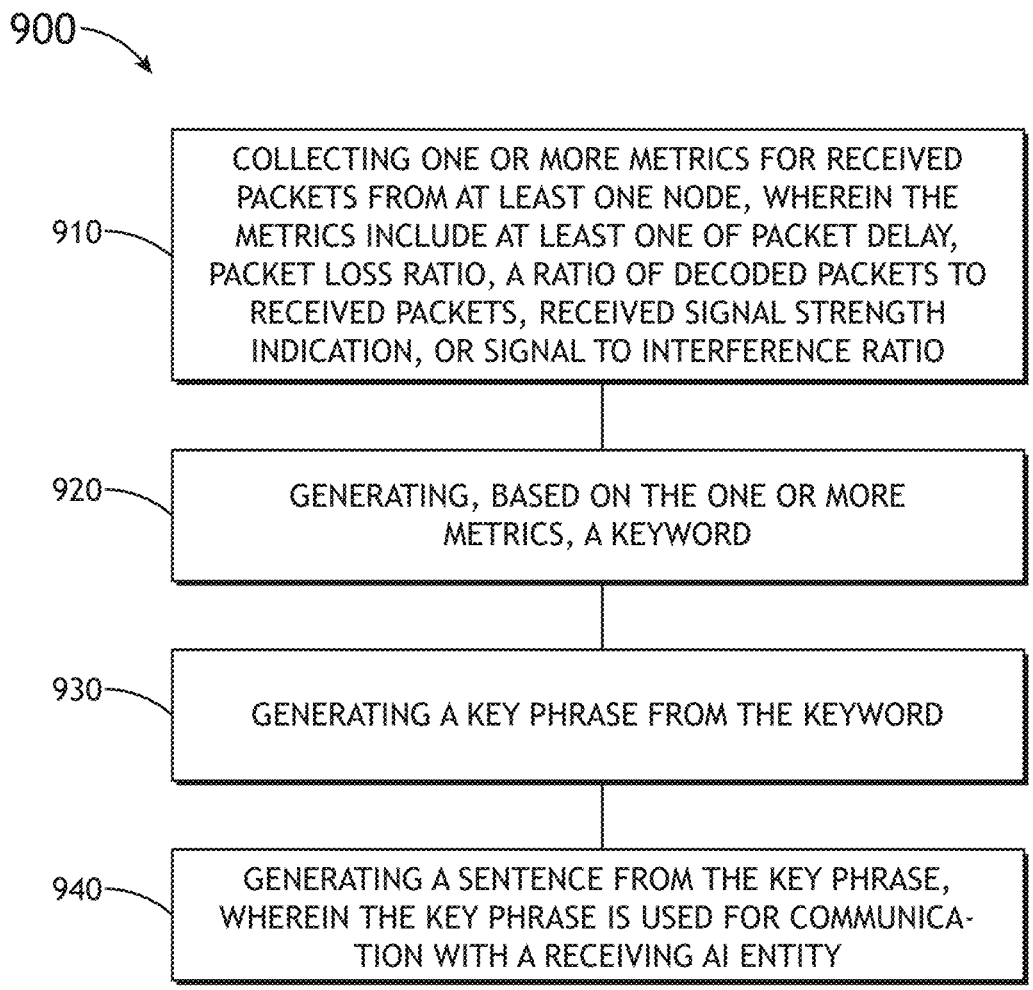
FIG. 9 is a flow chart illustrating a method 900 for installing an AI taxonomy into a system 100, in accordance with one or more embodiments of the disclosure.

FIG. 9 is a flow chart illustrating a method 900 for installing an AI taxonomy into a system 100, in accordance with one or more embodiments of the disclosure. The method 900 summarized the basic steps for generating an AI taxonomy as described herein. The method 900 is correlated to, and may contain one or more steps as, method 500.

In embodiments, the method 900 includes a step 910 of collecting one or more metrics from at least one node, w The metric may include any information and/or signal that can be received from an environment including but not limited to packet delay, packet loss ratio, a ratio of decoded packets to received packets, received signal strength indication, signal to interference ratio, or sensor returns (e.g., collected by one or more platforms). For example, the system 100 may collect metrics for RSSI and/or SNIR for the determination of jamming in the environment.

In embodiments, the method 900 includes a step 920 of generating, based on the one or more metrics, a keyword. For example, the keyword may be created that described one aspect of the RSSI metric (e.g., the RSSI is A). The keyword may also be a configured as a fusion of one or more characteristics of one or more keywords. For example, the keyword may describe two aspects of the RSSI metric (e.g., the RSSI is A, the hypothesis is X), as shown in table 312.

In embodiments, the method 900 includes a step 930 of generating a key phrase based on the keyword. For example, the phrase may include a RSSI-based keyword and a SNIR based keyword to create a 2-D key phrase stating that the SNIR is a function of RSSI, as shown in table 312.

In embodiments, the method 900 includes a step 940 of generating a sentence from the key phrase, wherein the key phrase is used for communication with a receiving AI entity. For example, a key phrase stating that the SNIR is a function of RSSI may be further augmented with a hypothesis and a collaborative decision data to form a sentence that states the RSSI is A, the hypothesis is X, and the collaborative decision is Y.

It is to be understood that embodiments of the methods disclosed in the patent may include one or more of the aspects described herein. The method of creating a key word followed by a key phrase and then a sentence can be expanded such that the method can create more than one keyword before creating a key phrase. Similarly, a sentence can be creating using more than one key phrase.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

What is claimed is:

1. A system comprising:
   a cognitive engine configured to install an artificial intelligence (AI) taxonomy comprising:
      a controller comprising:
         a processor; and
         a memory communicatively coupled to the processor, wherein the memory includes a set of executable program instructions, which when executed by the processor, cause the processor to:
            collect one or more metrics from node packets received from at least one node, wherein the one or more metrics include at least one of packet delay, packet loss ratio, a ratio of decoded packets to received packets, received signal strength indication, or signal to interference ratio;
            generate a keyword based on the one or more metrics;
            generate a key phrase based on the keyword in combination with another one of the one or more metrics; and
            generate a sentence from the key phrase, wherein the key phrase is used for communication with at least one of a plurality of network AI entities.

2. The system of claim 1, wherein a fusion of the one or more metrics is configured to create a local hypothesis.

3. The system of claim 2, wherein the set of executable program instructions further includes:
   receiving one or more AI packets from the at least one of the plurality of network AI entities; and
   consecutively updating at least one of the keyword, the key phrase, or the sentence based on the one or more AI packets.

4. The system of claim 3, wherein an updated keyword, an updated key phrase, or an updated sentence is configured to identify if an electromagnetic warfare attack is active.

5. The system of claim 1, wherein the sentence is configured as an N-dimensional vector in an N-dimensional space, wherein N is adaptable.

6. The system of claim 5, wherein the sentence is encrypted via a vector transform domain.

7. The system of claim 1, wherein the set of executable program instructions further includes decoding packets while correcting communication errors based on N-dimensional decision zones.

8. The system of claim 7, wherein the set of executable program instructions further includes discovering a denial-of-service attack based on the N-dimensional decision zones, wherein the denial-of-service attack is configured to alter packet contents.

9. The system of claim 1, wherein the set of executable program instructions further includes measuring communication entropy to optimize for data compression and an ability to detect communication errors, wherein an optimization of the data compression and the ability to detect the communication errors are configured to facilitate packet correction and the ability to discover denial-of-service attacks.

10. The system of claim 1, wherein the set of executable program instructions further includes measuring closed system entropy, wherein the measurement of closed system entropy is configured to facilitate an evaluation of one or more performance characteristics of the system.

11. The system of claim 1, wherein the set of executable program instructions further includes generating new software to address new threats.

12. The system of claim 1, further comprising a transceiver communicatively coupled to the cognitive engine configured to communicate with at least one of the node or the at least one of the plurality of network AI entities.

13. The system of claim 1, wherein the system is configured as another one of the plurality of network AI entities.

14. A method for installing an artificial intelligence (AI) taxonomy in a system comprising:
collecting, via controller of the system, one or more metrics from node packets received from at least one node, wherein the one or more metrics include at least one of packet delay, packet loss ratio, a ratio of decoded packets to received packets, received signal strength indication, or signal to interference ratio,
wherein the system comprises:
a cognitive engine configured to install the AI taxonomy comprising:
the controller comprising:
a processor; and
a memory communicatively coupled to the processor, wherein the memory includes a set of executable program instructions;
generating, via the system, based on the one or more metrics, a keyword;
generating, via the system, a key phrase based on the keyword in combination with another one of the one or more metrics; and
generating, via the system, a sentence from the key phrase, wherein the key phrase is used for communication with at least one of a plurality of network AI entities.

* * * * *